US008511444B2

(12) United States Patent
Mangelschots et al.

(10) Patent No.: US 8,511,444 B2
(45) Date of Patent: Aug. 20, 2013

(54) SHOCK ABSORBER HAVING A CONTINUOUSLY VARIABLE VALVE WITH BASE LINE VALVING

(75) Inventors: Gert Mangelschots, Heusden Zolder (BE); David Holiviers, Kuringen (BE); Gert Vanhees, Kortessem (BE); Patrick Vanmechelen, St.-Truiden (BE); Sjaak Schel, Eindhoven (NL); M'hand Nait Oukhedou, Bree (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 13/477,142

(22) Filed: May 22, 2012

(65) Prior Publication Data

US 2012/0228072 A1 Sep. 13, 2012

Related U.S. Application Data

(63) Continuation of application No. 13/034,050, filed on Feb. 24, 2011, now Pat. No. 8,256,586, which is a continuation of application No. 11/787,452, filed on Apr. 16, 2007, now Pat. No. 7,926,632.

(51) Int. Cl.
 *F16F 9/34* (2006.01)
(52) U.S. Cl.
 USPC .................................................. 188/266.6
(58) Field of Classification Search
 USPC .................. 188/266.1, 266.2, 266.5, 266.6
 See application file for complete search history.

(56) References Cited

U.S. PATENT DOCUMENTS

| | | | |
|---|---|---|---|
| 4,850,460 A | 7/1989 | Knecht et al. | |
| 5,163,538 A * | 11/1992 | Derr et al. | 188/266.6 |
| 5,730,261 A | 3/1998 | Spakowski et al. | |
| 5,813,500 A | 9/1998 | Deferme | |
| 5,960,915 A | 10/1999 | Nezu et al. | |
| 6,079,526 A | 6/2000 | Nezu et al. | |
| 6,155,391 A | 12/2000 | Kashiwagi et al. | |
| 6,182,805 B1 | 2/2001 | Kashiwagi et al. | |
| 6,321,888 B1 | 11/2001 | Reybrouck et al. | |
| 6,527,093 B2 | 3/2003 | Oliver et al. | |
| 7,926,632 B2 | 4/2011 | Mangelschots et al. | |

FOREIGN PATENT DOCUMENTS

| | | |
|---|---|---|
| JP | 04345516 A * | 12/1992 |
| JP | 10-047413 | 2/1998 |
| JP | 2001-012534 | 1/2001 |
| KR | 10-0211201 | 7/1999 |

OTHER PUBLICATIONS

International Search Report and Written Opinion Regarding PCT/US2008/004855 dated Aug. 27, 2008.

* cited by examiner

*Primary Examiner* — Thomas J Williams
(74) *Attorney, Agent, or Firm* — Harness, Dickey & Pierce, P.L.C.

(57) ABSTRACT

A shock absorber includes an external control valve which controls the damping characteristics of the shock absorber. The external control valve controls the flow of fluid between the lower working chamber of the shock absorber and the reservoir chamber and between the upper working chamber of the shock absorber. The damping characteristics are dependent on the amount of current being applied to a solenoid valve which controls a fluid valve assembly. A soft fluid valve assembly is disposed in series with the fluid valve assembly to allow for the tuning of the damping forces at low current levels provided to the solenoid valve.

10 Claims, 4 Drawing Sheets

SHOCK ABSORBER HAVING A CONTINUOUSLY VARIABLE VALVE WITH BASE LINE VALVING

CROSS-REFERENCE TO RELATED APPLICATIONS

This application is a continuation of U.S. patent application Ser. No. 13/034,050 filed on Feb. 24, 2011 which is a continuation of U.S. patent application Ser. No. 11/787,452 filed on Apr. 16, 2007, now U.S. Pat. No. 7,926,632. The entire disclosures of the above applications are incorporated herein by reference.

FIELD

The present disclosure relates to a hydraulic damper or shock absorber adapted for use in a suspension system such as the suspension systems used for automotive vehicles. More particularly, the present disclosure relates to a hydraulic damper or shock absorber having an externally mounted electromagnetic control valve with soft valving which generates different pressure-flow characteristics as a function of the current supplied to the electromagnetic control valve.

BACKGROUND

The statements in this section merely provide background information related to the present disclosure and may not constitute prior art.

A conventional hydraulic damper or shock absorber comprises a cylinder which is adapted at one end for attachment to the sprung or unsprung mass of a vehicle. A piston is slidably disposed within the cylinder with the piston separating the interior of the cylinder into two fluid chambers. A piston rod is connected to the piston and extends out of one end of the cylinder where it is adapted for attachment to the other of the sprung or unsprung mass of the vehicle. A first valving system is typically incorporated within the piston functions during the shock absorber's extension stroke of the piston with respect to the cylinder to create a damping load. A second valving system typically incorporated within the piston in a mono-tube design and in the base valve assembly in a dual-tube design functions during the shock absorber's compression stroke of the piston with respect to the cylinder to create a damping load.

Various types of adjustment mechanisms have been developed to generate damping forces in relation to the speed and/or amplitude of the displacement of the sprung or unsprung mass. These adjustment mechanisms have mainly been developed to provide a relatively small or low damping characteristic during the normal steady state running of the vehicle and a relatively large or high damping characteristic during vehicle maneuvers requiring extended suspension movements. The normal steady state running of the vehicle is accompanied by small or fine vibrations of the unsprung mass of the vehicle and thus the need for a soft ride or low damping characteristic of the suspension system to isolate the sprung mass from these small vibrations. During a turning or braking maneuver, as an example, the sprung mass of the vehicle will attempt to undergo a relatively slow and/or large movement or vibration which then requires a firm ride or high damping characteristic of the suspension system to support the sprung mass and provide stable handling characteristics to the vehicle. These adjustable mechanisms for the damping rates of a shock absorber offer the advantage of a smooth steady state ride by isolating the high frequency/small amplitude excitations from the unsprung mass while still providing the necessary damping or firm ride for the suspension system during vehicle maneuvers causing low frequency/large excitations of the sprung mass. Often, these damping characteristics are controlled by an externally mounted control valve. An externally mounted control valve is advantageous in that it may be easily removed for service or replacement.

The continued development of shock absorbers includes the development of adjustment systems which provide the vehicle designer with a continuously variable system which can be specifically tailored to a vehicle to provide a specified amount of damping in relation to various monitored conditions of the vehicle and its suspension system.

SUMMARY

A shock absorber according to the present disclosure includes a pressure tube defining a working chamber. A piston is slidably disposed on the pressure tube within the working chamber and the piston divides the working chamber into an upper working chamber and a lower working chamber. A reserve tube surrounds the pressure tube to define a reserve chamber. An intermediate tube is disposed between the reserve tube and the pressure tube to define an intermediate chamber. An external control valve is secured to the reserve tube and the intermediate tube. An inlet to the control valve is in communication with the intermediate chamber and an outlet of the control valve is in communication with the reserve chamber. The control valve generates different pressure flow characteristics for the damper or shock absorber which controls the damping characteristics for the damper or shock absorber. The different pressure-flow characteristics are a function of the current supplied to the control valve.

The external control valve also includes the ability to tune the soft damping characteristics for the shock absorber. The soft damping allows for the tuning of the damping forces at low current levels provided to the control valve over the complete velocity range of the shock absorber.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
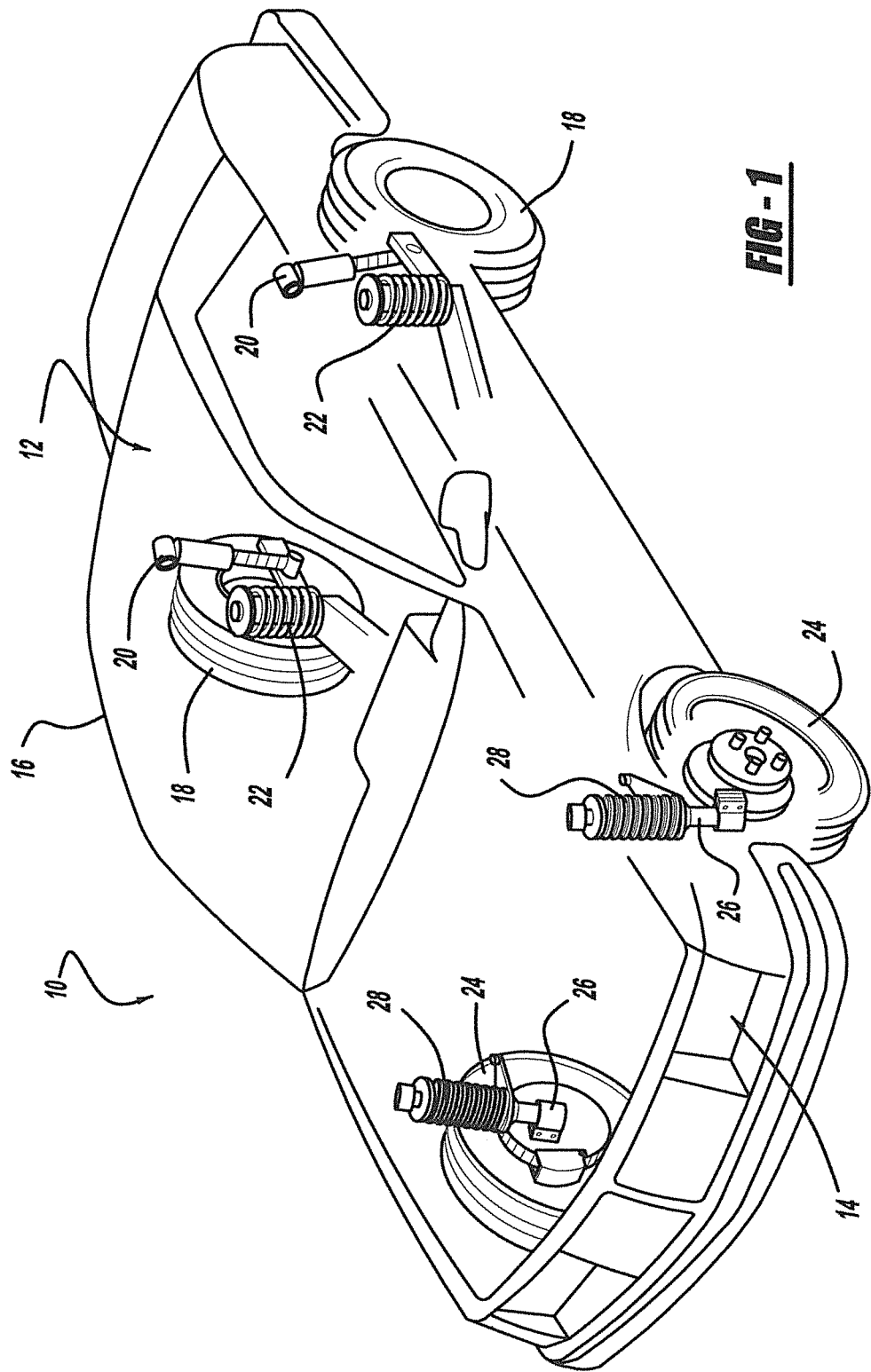
FIG. 1 illustrates an automotive vehicle which incorporates shock absorbers in accordance with the present disclosure.

The following description is merely exemplary in nature and is not intended to limit the present disclosure, application, or uses. Referring now to the drawings in which like reference numerals designate like components throughout the several views, there is shown in FIG. 1 a vehicle incorporating a suspension system having shock absorbers in accordance with the present disclosure, and which is designated by the reference numeral 10.

Vehicle 10 includes a rear suspension 12, a front suspension 14 and a body 16. Rear suspension 12 has a transversely extending rear axle assembly (not shown) adapted to operatively support a pair of rear wheels 18. The rear axle is attached to body 16 by means of a pair of shock absorbers 20 and by a pair of springs 22. Similarly, front suspension 14 includes a transversely extending front axle assembly (not shown) to operatively support a pair of front wheels 24. The front axle assembly is attached to body 16 by means of a pair of shock absorbers 26 and by a pair of springs 28. Shock absorbers 20 and 26 serve to dampen the relative motion of the unsprung portion (i.e., front and rear suspensions 12, 14) with respect to the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating non-independent front and/or non-independent rear suspensions, vehicles incorporating independent front and/or independent rear suspensions or other suspension systems known in the art. Further, the term "shock absorber" as used herein is meant to refer to dampers in general and thus will include McPherson struts and other damper designs known in the art.

Figure 2:
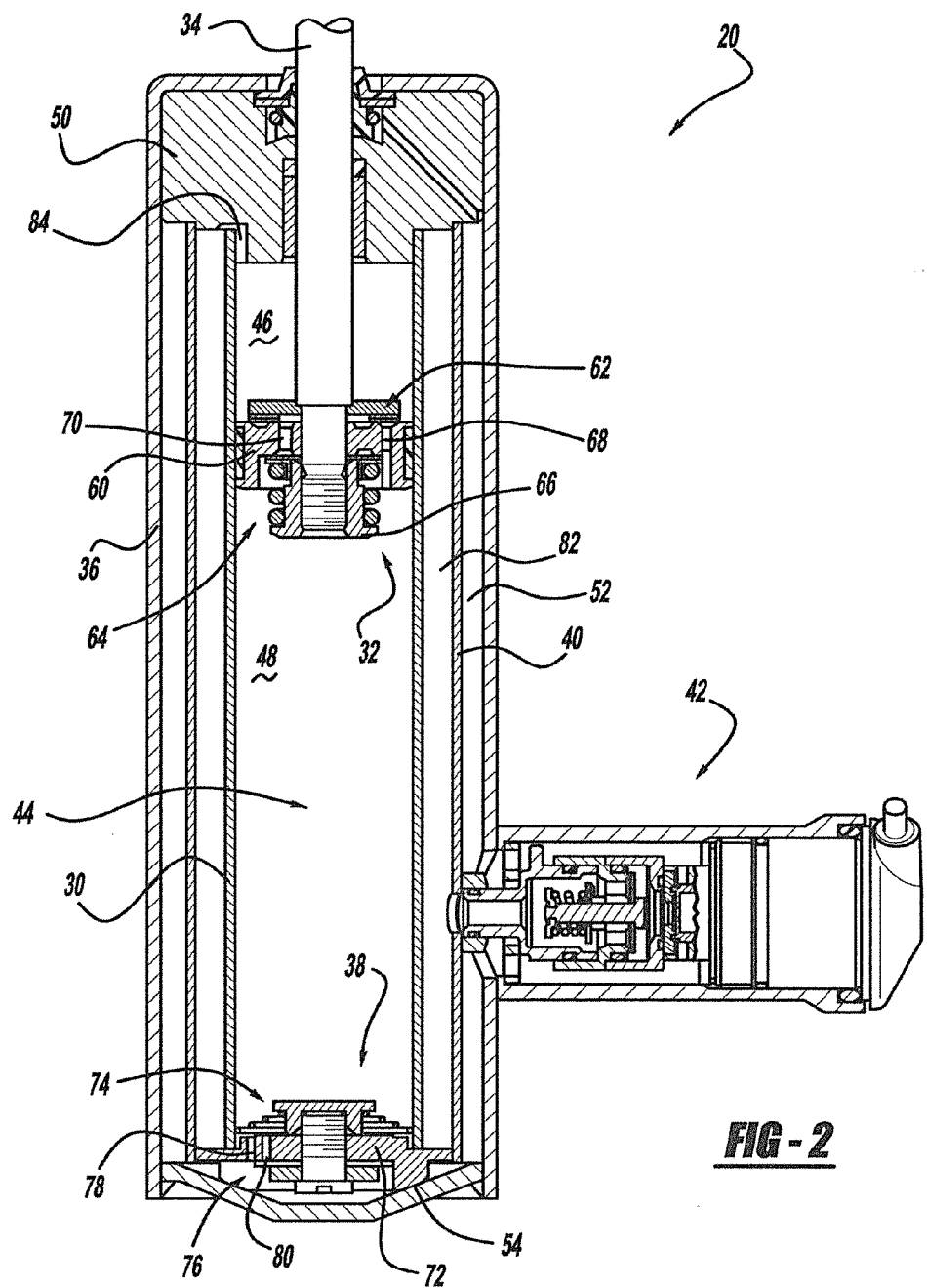
FIG. 2 is a cross-sectional side view of one of the shock absorbers illustrated in FIG. 1.

Referring now to FIG. 2, shock absorber 20 is shown in greater detail. While FIG. 2 illustrates only shock absorber 20, it is to be understood that shock absorber 26 also includes the control valve design described below for shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod 34, a reserve tube 36, a base valve assembly 38, an intermediate tube 40 and an externally mounted control valve 42.

Pressure tube 30 defines a working chamber 44. Piston assembly 32 is slidably disposed within pressure tube 30 and divides working chamber 44 into an upper working chamber 46 and a lower working chamber 48. A seal is disposed between piston assembly 32 and pressure tube 30 to permit sliding movement of piston assembly 32 with respect to pressure tube 30 without generating undue frictional forces as well as sealing upper working chamber 46 from lower working chamber 48. Piston rod 34 is attached to piston assembly 32 and extends through upper working chamber 46 and through an upper rod guide assembly 50 which closes the upper end of pressure tube 30. A sealing system seals the interface between upper rod guide assembly 50, reserve tube 36 and piston rod 34. The end of piston rod 34 opposite to piston assembly 32 is adapted to be secured to the sprung mass of vehicle 10. Because piston rod 34 extends only through upper working chamber 46 and not lower working chamber 48, extension and compression movements of piston assembly 32 with respect to pressure tube 30 causes a difference in the amount of fluid displaced in upper working chamber 46 and the amount of fluid displaced in lower working chamber 48. The difference in the amount of fluid displaced is known as the "rod volume" and during extension movements it flows through base valve assembly 38. During a compression movement of piston assembly 32 with respect to pressure tube 30, valving within piston assembly 32 allow fluid flow from lower working chamber 48 to upper working chamber 46 and the "rod volume" of fluid flow flows through control valve 42 as described below.

Reserve tube 36 surrounds pressure tube 30 to define a fluid reserve chamber 52 located between tubes 30 and 36. The bottom end of reserve tube 36 is closed by a base cup 54 which is adapted to be connected to the unsprung mass of vehicle 10. The upper end of reserve tube 36 is attached to upper rod guide assembly 50. Base valve assembly 38 is disposed between lower working chamber 48 and reserve chamber 52 to control the flow of fluid from reserve chamber 52 to lower working chamber 48. When shock absorber 20 extends in length, an additional volume of fluid is needed in lower working chamber 48 due to the "rod volume" concept. Thus, fluid will flow from reserve chamber 52 to lower working chamber 48 through base valve assembly 38 as detailed below. When shock absorber 20 compresses in length, an excess of fluid must be removed from lower working chamber 48 due to the "rod volume" concept. Thus, fluid will flow from lower working chamber 48 to reserve chamber 52 through control valve 42 as detailed below.

Piston assembly 32 comprises a piston body 60, a compression valve assembly 62 and an extension valve assembly 64. A nut 66 is assembled to piston rod 34 to secure compression valve assembly 62, piston body 60 and extension valve assembly 64 to piston rod 34. Piston body 60 defines a plurality of compression passages 68 and a plurality of extension passages 70. Base valve assembly 38 comprises a valve body 72, an extension valve assembly 74 and a compression valve assembly 76. Valve body 72 defines a plurality of extension passages 78 and a plurality of compression passages 80.

During a compression stroke, fluid in lower working chamber 48 is pressurized causing fluid pressure to react against compression valve assembly 62. Compression valve assembly 62 acts as a check valve between lower working chamber 48 and upper working chamber 46. The damping characteristics for shock absorber 20 during a compression stroke are controlled by control valve 42 alone and possibly by control valve 42 working in parallel with base valve assembly 38 as described below. Control valve 42 controls the flow of fluid from lower working chamber 48 to upper working chamber 46 to control valve 42 to reserve chamber 52 due to the "rod volume" concept during a compression stroke as discussed below. Compression valve assembly 76 controls the flow of fluid from lower working chamber 48 to reserve chamber 52 during a compression stroke. Compression valve assembly 76 can be designed as a safety hydraulic relief valve, a damping valve working in parallel with control valve 42 or compression valve assembly can be removed from base valve assembly 38. During an extension stroke, compression passages 68 are closed by compression valve assembly 62.

During an extension stroke, fluid in upper working chamber 46 is pressurized causing fluid pressure to react against extension valve assembly 64. Extension valve assembly 64 is designed as either a safety hydraulic relief valve which will open when the fluid pressure within upper working chamber 46 exceeds a predetermined limit or as a typical pressure valve working in parallel with control valve 42 to change the shape of the damping curve as discussed below. The damping characteristics for shock absorber 20 during an extension stroke are controlled by control valve 42 alone or by control valve 42 in parallel with extension valve assembly 64 as discussed below. Control valve 42 controls the flow of fluid from upper working chamber 46 to reserve chamber 52. Replacement flow of fluid into lower working chamber 48 during an extension stroke flows through base valve assembly 38. Fluid in lower working chamber 48 is reduced in pressure causing fluid pressure in reserve chamber 52 to open extension valve assembly 74 and allow fluid flow from reserve chamber 52 to lower working chamber 48 through extension passages 78. Extension valve assembly 74 acts as a check valve between reserve chamber 52 and lower working chamber 48. The damping characteristics for shock absorber 20 during an extension stroke are controlled by control valve 42 alone and possibly by extension valve assembly 64 in parallel with control valve 42 as described below.

Intermediate tube 40 engages upper rod guide assembly 50 on an upper end and it engages base valve assembly 38 on a lower end. An intermediate chamber 82 is defined between intermediate tube 40 and pressure tube 30. A passage 84 is formed in upper rod guide assembly 50 for fluidly connecting upper working chamber 46 and intermediate chamber 80.

Figure 3:
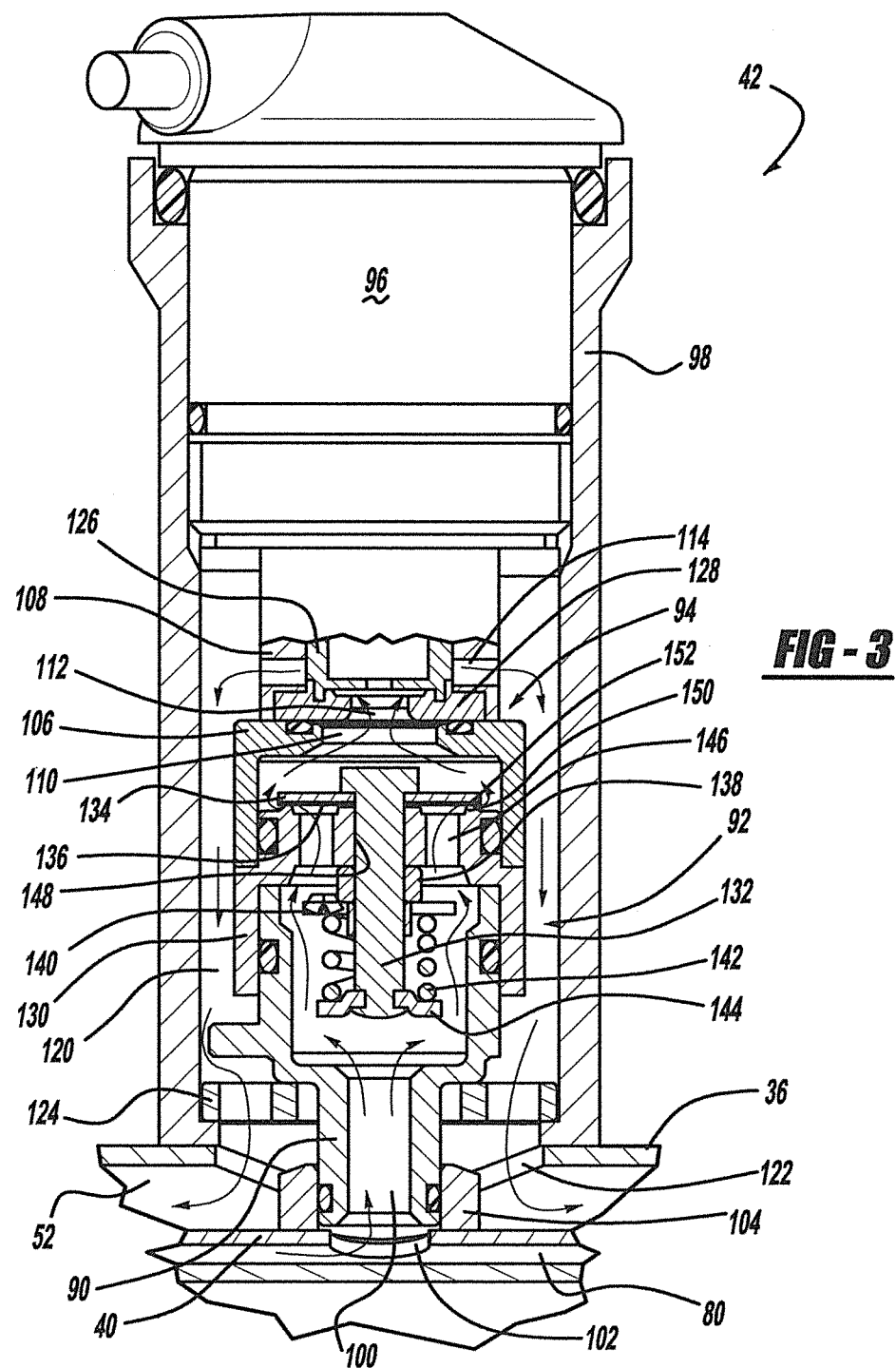
FIG. 3 is an enlarged cross-sectional side view of the externally mounted control valve illustrated in FIG. 2.

Referring to FIG. 3, control valve 42 is illustrated in greater detail. Control valve 42 comprises an attachment fitting 90, a soft valve assembly 92, a valve assembly 94, a solenoid valve assembly 96 and an outer housing 98. Attachment fitting 90 defines an inlet passage 100 aligned with a fluid passage 102 which extends through intermediate tube 40 for fluid communication between intermediate chamber 82 and control valve 42. Attachment fitting 90 is axially received within a collar 104 mounted on intermediate tube 40. An O-ring seals the interface between attachment fitting 90 and collar 104. Collar 104 is preferably a distinct piece from intermediate tube 40 and it is mounted onto intermediate tube 40 by welding or by any other means known in the art.

Attachment fitting 90, soft valve assembly 92, valve assembly 94, and solenoid valve assembly 96 are all disposed within outer housing 98 and outer housing 98 is attached to reserve tube 36 by welding or by any other means known in the art. Valve assembly 94 includes a valve seat 106 and solenoid valve assembly 96 includes a valve body assembly 108. Valve seat 106 defines an axial bore 110 which receives fluid from soft valve assembly 92, valve body assembly 108 defines an axial bore 112 and a plurality of radial passages 114 which communicate with a return flow passage 120 which is in communication with reserve chamber 52 through a fluid passage 122 formed through reserve tube 36. An attachment plate 124 is secured to outer housing 98 to position attachment fitting 90 and the rest of the components of control valve 42 within outer housing 98.

Referring to FIGS. 2 and 3, the operation of shock absorber 20 will be described when control valve 42 alone controls the damping loads for shock absorber 20. During a rebound or extension stroke, compression valve assembly 62 closes the plurality of compression passages 68 and fluid pressure within upper working chamber 46 increases. Fluid is forced from upper working chamber 46, through passage 84, into intermediate chamber 82, through fluid passage 102, through inlet passage 100 of attachment fitting 90, through soft valve assembly 92 as discussed below, to reach valve assembly 94.

The higher flow damping characteristics of shock absorber 20 are determined by the configuration of valve assembly 94 and solenoid valve assembly 96. As such, valve assembly 94 and solenoid valve assembly 96 are configured to provide a predetermined damping function which is controlled by the signal provided to solenoid valve assembly 96. The predetermined damping function can be anywhere between a soft damping function to a firm damping function based upon the operating conditions of vehicle 10. At low piston velocities, control valve 42 remains closed and fluid flows through bleed passages that are made in piston assembly 32 and base valve assembly 38. Shock absorber 20 thus operates similar to a typical double tube damper. At higher piston velocities, as fluid flow increases, fluid pressure against a plunger 126 of valve body assembly 108 will separate plunger 126 of valve body assembly 108 from a valve seat 128 of valve body assembly 108 and fluid will flow between plunger 126 of valve body assembly 108 and valve seat 128 of valve body assembly 108, through radial passages 114, through return flow passage 120, through fluid passage 122 and into reserve chamber 52. The fluid pressure required to separate plunger 126 of valve body assembly 108 from valve seat 128 of valve body assembly 108 will be determined by solenoid valve assembly 96. The rebound or extension movement of piston assembly 32 creates a low pressure within lower working chamber 48. Extension valve assembly 74 will open to allow fluid flow from reserve chamber 52 to lower working chamber 48.

During a compression stroke, compression valve assembly 62 will open to allow fluid flow from lower working chamber 48 to upper working chamber 46. Due to the "rod volume" concept, fluid in upper working chamber 46 will flow from upper working chamber 46, through passage 84, into intermediate chamber 82, through fluid passage 102, through inlet passage 100 of attachment fitting 90, through soft valve assembly 92 as discussed below, to reach valve assembly 94.

Similar to an extension or rebound stroke, the damping characteristics of shock absorber 20 are determined by the configuration of valve assembly 94 and solenoid valve assembly 96. As such, valve assembly 94 and solenoid valve assembly 96 are configured to provide a predetermined damping function which is controlled by the signal provided to solenoid valve assembly 96. The predetermined damping function can be anywhere between a soft damping function to a firm damping function based upon the operating conditions of vehicle 10. At low piston velocities, control valve 42 remains closed and fluid flows through the bleed passages that are made in piston assembly 32 and base valve assembly 38. Shock absorber 20 thus operates similar to a typical double tube damper at higher piston velocities, as fluid flow increases, fluid pressure against plunger 126 of valve body assembly 108 will separate plunger 126 of valve body assembly 108 from valve seat 128 of valve body assembly 108 and fluid will flow between plunger 126 of valve body assembly 108 and valve seat 128 of valve body assembly 108, through radial passages 114, through return flow passage 120, through fluid passage 122 and into reserve chamber 52. The fluid pressure required to separate plunger 126 of valve body assembly 108 from valve seat 128 of valve body assembly 108 will be determined by solenoid valve assembly 96. Thus, the damping characteristics for both an extension stroke and a compression stroke are controlled by control valve 42 in the same manner.

The fluid flow through and the damping generation characteristics for soft valve assembly 92, similar to the fluid flow through and the damping characteristics for valve assembly 94, are the same for both a compression stroke and a rebound or extension stroke. Soft valve assembly 92 comprises a valve body 130, a valve pin 132, an intake disc 134, an orifice disc 136, a spacer 138, an upper spring seat 140, a biasing spring 142 and a lower spring seat 144.

Valve body 130 is disposed between attachment fitting 90 and valve seat 106. An O-ring seals the interface between valve body 130 and attachment fitting 90 and an O-ring seals the interface between valve body 130 and valve seat 106. Valve body 130 defines a plurality of fluid passages 146 and a central bore 148. Valve pin 132 extends through central bore 148.

Intake disc 134 and orifice disc 136 are disposed between valve body 130 and valve pin 132 with orifice disc 136 engaging an annular land 150 on valve body 130 to close fluid passages 146 and intake disc 134 being disposed between orifice disc 136 and valve pin 132. One or more bleed orifices 152 are defined by orifice disc 136 to allow a bleed flow of fluid through soft valve assembly 92 as discussed below. While the present disclosure illustrates orifice disc 136 having bleed orifices 152, it is within the scope of the present disclosure to have annular land 150 define bleed orifices 152. Assembled to valve pin 132 on the side of valve body 130 opposite to intake disc 134 and orifice disc 136 are spacer 138, upper spring seat 140, biasing spring 142 and lower spring seat 144. Lower spring seat 144 is secured to valve pin 132 to maintain the assembly of soft valve assembly 92. Biasing spring 142 urges valve pin 132 against intake disc 134 which is biased against orifice disc 136 which is biased against annular land 150 on valve body 130.

Soft valve assembly 92 provides for the tuning of damping forces at low current levels for solenoid valve assembly 96. Fluid flow flowing to soft valve assembly 92 from inlet passage 100 of attachment fitting 90 is directed to fluid passages 146. The initial fluid flow will flow through bleed orifices 152 to valve assembly 94 through valve seat 106. Fluid flow through valve assembly 94 is described above. As the fluid flow through bleed orifices 152 increases, the fluid pressure against orifice disc 136 and intake disc 134 will eventually overcome the biasing load produced by biasing spring 142 and orifice disc 136 will unseat from annular land 150 to open soft valve assembly 92. This fluid flow will also be directed to valve assembly 94 through valve seat 106. Tuning for soft valve assembly 92 can be accomplished by varying the size and/or load of biasing spring 142, varying the thickness and/or flexibility of intake disc 134 and/or orifice disc 136, varying the size and/or number of bleed orifices 152 and varying the size and/or number of fluid passages 146. The incorporation of soft valve assembly 92 allows for the tuning or alteration of the shape of the damping curve at low current levels to solenoid valve assembly 96 to adapt shock absorber 20 to a specific vehicle performance. Because the pressure drop across soft valve assembly 92 is very low at high current levels to solenoid valve assembly 96 compared to the pressure drop across control valve 42, its effect on the damping characteristics is negligible.

As described above, soft valve assembly 92 allows for the tuning or alteration of the shape of the damping curve only at low current levels to solenoid valve assembly 96. In order to change or alter the damping curve at high current levels to solenoid valve assembly 96, extension valve assembly 64 needs to be changed and compression valve assembly 76 needs to be included.

If only control valve 42 controls the damping loads for shock absorber 20, extension valve assembly 64 and compression valve assembly 76 are designed as hydraulic pressure relief valves or they are removed from the assembly. In order to tune or alter the damping curve at high current levels to solenoid valve assembly, extension valve assembly 64 and compression valve assembly 76 are designed as damping valves for opening at specific fluid pressures to contribute to the damping characteristics for shock absorber 20 in parallel with control valve 42.

Figure 4:
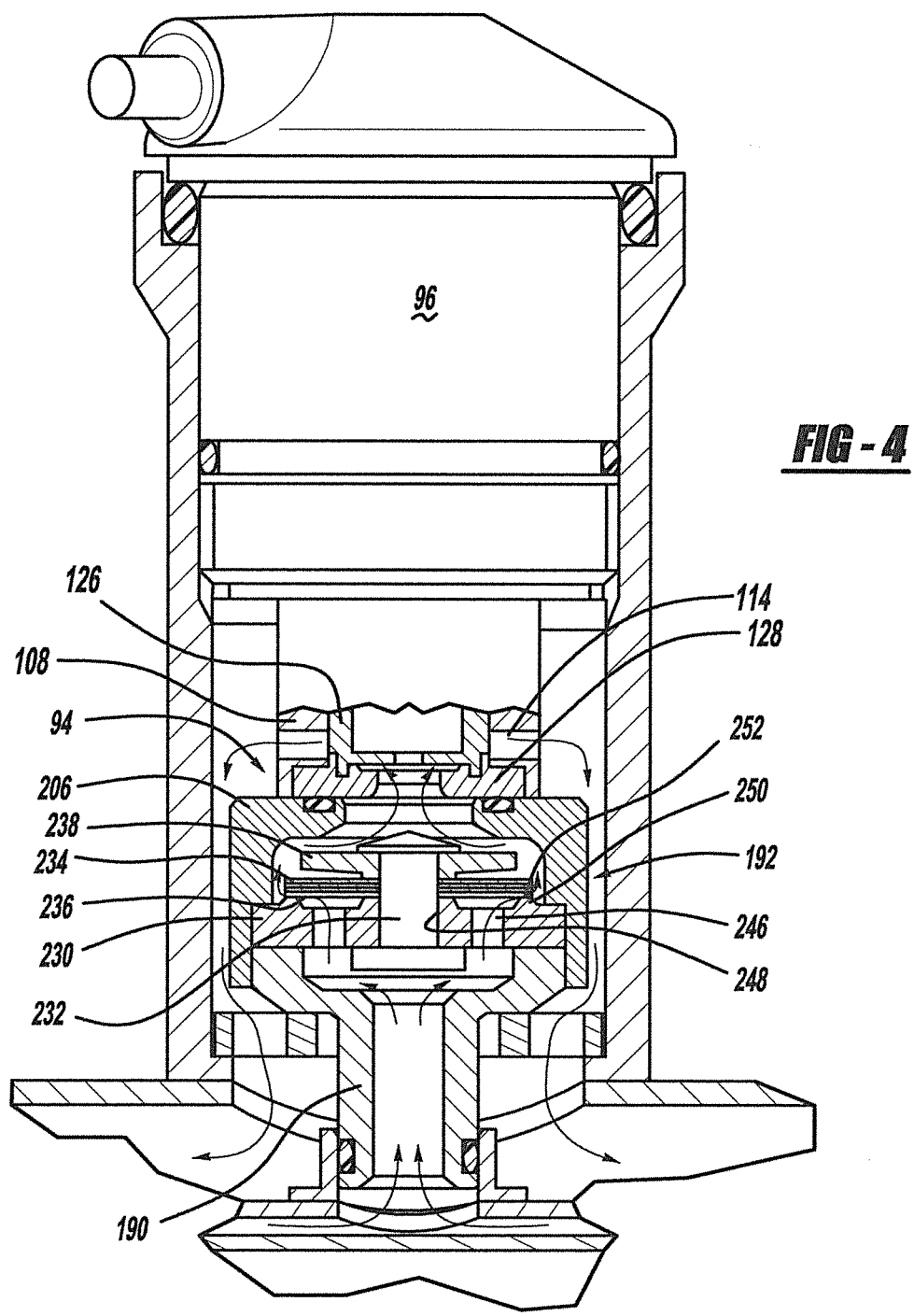
FIG. 4 is an enlarged cross-sectional side view of an externally mounted control valve in accordance with another embodiment of the disclosure.

Referring now to FIG. 4, a soft valve assembly 192 in accordance with the present disclosure is illustrated. Soft valve assembly 192 is a direct replacement for soft valve assembly 92 with soft valve assembly 192 being disposed between an attachment fitting 190 and a valve seat 206. Attachment fitting 190 is a direct replacement for attachment fitting 90 and valve seat 206 is a direct replacement for valve seat 106.

The flow through and the damping generation characteristics for soft valve assembly 192 are also the same for both a compression stroke and a rebound or extension stroke. Soft valve assembly 192 comprises a valve body 230, a valve pin 232, a plurality of intake discs 234, an orifice disc 236 and a valve retainer 238.

Valve body 230 is disposed between attachment fitting 190 and valve seat 206. Valve body 230 defines a plurality of fluid passages 246 and a central bore 248. Valve pin 232 extend through central bore 248.

Valve retainer 238, the plurality of intake discs 234 and orifice disc 236 are disposed between valve body 230 and valve pin 232 with orifice disc 236 engaging an annular land 250 on valve body 230 to close fluid passages 246. The plurality of intake discs 234 engage orifice disc 236 and valve retainer 238 is disposed between the plurality of intake discs 234 and valve pin 232. One or more bleed orifices 252 are defined by orifice disc 236 to allow a bleed flow of fluid through soft valve assembly 192 as discussed below. While the present disclosure illustrates orifice disc 236 having bleed orifices 252, it is within the scope of the present disclosure to have annular land 250 define bleed orifices 252.

Soft valve assembly 192 provides for the tuning of damping forces at low current levels for solenoid valve assembly 96. Fluid flow flowing to soft valve assembly 192 from inlet passage 100 of attachment fitting 190 is directed to fluid passages 246. The initial fluid flow will flow through bleed orifices 252 to valve assembly 94 through valve seat 206. Fluid flow through valve assembly 94 is described above. As the fluid flow through bleed orifices 252 increases, the fluid pressure against orifice disc 236 and the plurality of intake discs 234 will eventually overcome the bending load for the plurality of intake discs 234 and orifice disc 236 and orifice disc 236 will unseat from annular land 250 to open soft valve assembly 192. This fluid flow will also be directed to valve assembly 94 through valve seat 206. Tuning for soft valve assembly 192 can be accomplished by varying the thickness and/or flexibility of the plurality of intake discs 234 and/or orifice disc 236, varying the size and/or number of bleed orifices 252 and varying the size and/or number of fluid passages 246. The incorporation of soft valve assembly 192 allows for the tuning or alteration of the shape of the damping curve to adapt shock absorber 20 to a specific vehicle performance.

What is claimed is:

1. A shock absorber comprising:
   a pressure tube forming a fluid chamber;
   a piston assembly slidably disposed within said pressure tube, said piston assembly dividing said fluid chamber into an upper working chamber and a lower working chamber;
   a reserve tube disposed around said pressure tube;
   an intermediate tube disposed between said pressure tube and said reserve tube, an intermediate chamber being defined between said intermediate tube and said pressure tube, a reservoir chamber being defined between said intermediate tube and said reserve tube; and
   a control assembly mounted to said reserve tube, said control assembly having an inlet in communication with said intermediate chamber and an outlet in communication with said reservoir chamber, said control assembly comprising:
   a first valve assembly disposed between said inlet and said outlet; and
   a second variable valve assembly disposed between said first valve assembly and said outlet; wherein
   said first and second valve assemblies are in series between said inlet and said outlet such that during all fluid flow through said control assembly, all fluid flow from said first valve assembly always flows through said second valve assembly;

said second variable valve assembly controlling fluid flow to generate a variable damping characteristic for said shock absorber; and said second variable valve assembly includes a valve seat, a plunger and a solenoid valve assembly generating a variable load which urges said plunger into engagement with said valve seat.

2. The shock absorber according to claim 1, wherein fluid pressure in said intermediate chamber urges said plunger in a direction away from said valve seat to separate said plunger from said valve seat to open said second valve assembly.

3. The shock absorber according to claim 1, wherein a biasing member of the first valve assembly is a coil spring.

4. The shock absorber according to claim 1, wherein said first valve assembly defines a constantly open fluid passage between said first valve assembly and said second valve assembly.

5. The shock absorber according to claim 1, wherein a valve body of said first valve assembly defines a central bore, said first valve assembly further comprising a valve pin extending through said central bore and a biasing member urging said valve pin against an intake disc to urge said intake disc into engagement with said valve body.

6. The shock absorber according to claim 5, wherein said control assembly further comprises a seal directly engaging said valve body and directly engaging said valve seat.

7. The shock absorber according to claim 1, wherein said control assembly further comprises an attachment fitting disposed between said first valve assembly and said reserve tube.

8. The shock absorber according to claim 7, wherein said control assembly further comprises a seal directly engaging a valve body of said first valve assembly and directly engaging said attachment fitting.

9. The shock absorber according to claim 7, wherein a valve body of said first valve assembly defines a central bore, said first valve assembly further comprising a valve pin extending through said central bore and a biasing member urging said valve pin against an intake disc to urge said intake disc into engagement with said valve body.

10. The shock absorber according to claim 1, wherein said first valve assembly includes a valve body, an intake disc engaging said valve body and a first biasing member urging said intake disc into engagement with said valve body.

\* \* \* \* \*